(12) United States Patent
Okada et al.

(10) Patent No.: US 6,515,046 B2
(45) Date of Patent: Feb. 4, 2003

(54) METHOD OF MANUFACTURING POWDER COATING

(75) Inventors: Katsuhiko Okada, Osaka (JP); Tetsuro Agawa, Osaka (JP)

(73) Assignees: Dainippon Ink and Chemicals, Inc., Tokyo (JP); Liquid Gas Co., Ltd., Osaka (JP)

(*) Notice: Subject to any disclaimer, the term of this patent is extended or adjusted under 35 U.S.C. 154(b) by 0 days.

(21) Appl. No.: 09/828,472

(22) Filed: Apr. 9, 2001

(65) Prior Publication Data

US 2002/0028866 A1 Mar. 7, 2002

(51) Int. Cl.[7] .............................. C08K 5/05; C08L 63/02
(52) U.S. Cl. ...................... 523/456; 525/327.3; 525/386
(58) Field of Search ........................ 523/456; 525/327.3, 525/386

(56) References Cited

U.S. PATENT DOCUMENTS 3,893,977 A * 7/1975 Wingler ........................ 528/45
4,009,131 A * 2/1977 Farone ........................ 523/437

FOREIGN PATENT DOCUMENTS

| EP | A1 0312610 | 4/1989 |
| EP | 0 420 097 A2 | 4/1991 |
| EP | 0 962 472 A2 | 12/1999 |

* cited by examiner

Primary Examiner—Robert Dawson
Assistant Examiner—D. Aylward
(74) Attorney, Agent, or Firm—Armstrong, Westerman & Hattori, LLP

(57) ABSTRACT

A method of manufacturing a powder coating is provided which does not require a long complicated process, which enables the paint to be manufactured easily and with good conservation of energy, and moreover is free of any danger of gelling during the manufacturing process. The powder coating is manufactured by spray drying a powder coating raw materials solution comprising, as essential constituents, an epoxy group containing acrylic resin (A), a polyvalent carboxylic acid (B), and an organic solvent (C) incorporating an alcohol (C-1) of 2 to 4 carbon atoms, at a temperature at which the epoxy group containing acrylic resin (A) and the polyvalent carboxylic acid (B) undergo no substantial curing reaction.

5 Claims, No Drawings

METHOD OF MANUFACTURING POWDER COATING

BACKGROUND OF THE INVENTION

1. Field of the Invention

The present invention relates to a method of manufacturing a powder coating applicable to fields such as the painting of vehicle bodies and components, construction materials, and household electrical appliances. In particular, the invention relates to a method of manufacturing a powder coating by an environmentally friendly spray drying method in which the manufacturing is able to be completed easily, without a long complicated process, and with good conservation of energy.

2. Description of Related Art

Powder coatings are widely used for the general painting of metals, as environmentally friendly paints which do not release organic solvents into the atmosphere during paint application.

Normally, a powder coating is manufactured by manufacturing a main constituent resin, subjecting the resin to coarse crushing, dry blending with a hardener and various additives, and then subjecting the dry blend to extrusion, cooling, a second crushing process, and classification. Compared with solvent based paints, the manufacturing process is long and complex, and consequently the problem arises of increased manufacturing cost. In order to resolve this problem, trials are being conducted on preparing a raw materials solution by dissolving or dispersing the raw materials, namely the main constituent resin, the hardener and the various additives, in a solvent, and then removing the solvent to obtain the powder coating directly.

In such a case, in order to obtain the final product powder coating, a step for removing the solvent is necessary, although if during solvent removal the raw materials solution is heated to a high temperature, the main constituent resin and the hardener undergo a curing reaction, resulting in gelling.

Furthermore, spray drying has also been proposed as a method of removing the solvent. For example, a method is disclosed in EP0420097, wherein a powder coating raw materials solution dispersed in water is converted to powder by spray drying. However, in the case of this method, dispersants and the like are necessary for dispersing the powder coating raw materials in water, and so not only does the cost of the raw materials increase, but there is also a danger of a reduction in the storage stability of the paint, and reductions in the water resistance and chemical resistance of the formed paint film. Furthermore, because water, which has a large specific heat and a large latent heat of vaporization, is used as the medium, the thermal energy cost required in the drying process is extremely high.

In EP0312610, a method is disclosed in which a raw materials solution comprising a main constituent resin and an organic solvent is subjected to drying. However, in the case of this manufacturing method, because a high temperature solvent gas which has been heated to a superheated vapor state is used as the heat source gas, there is a danger that within the system comprising the main constituent resin and the hardener, the powder coating raw materials will be exposed to high temperatures during the drying process, causing the main constituent resin and the hardener to undergo a curing reaction which will result in a gelling of the paint, making it unusable as a powder coating.

Furthermore, in EP0962472A2, a method of manufacturing a powder coating is disclosed wherein an acrylic resin containing an epoxy group is used as the main constituent resin, and this main constituent resin is polymerized in methanol, before a hardener is added and the resulting raw materials solution is then spray dried. However in this method, because methanol, in which the main constituent resin is very insoluble, is used in the polymerization reaction of the main constituent resin, the main constituent resin is susceptible to precipitating out of the raw materials solution, and at normal temperatures it is extremely difficult to dissolve the main constituent resin uniformly in the raw materials solution, meaning the raw materials solution needs to be heated. Furthermore, because the boiling point of methanol is low, in order to cool, liquefy and recover the evaporated methanol vapor following the spray drying process, the temperature of the recovery apparatus must be kept extremely low, meaning the energy costs associated with the manufacture are high. Even in the case where the solvent is not recovered, the resultant increase in the cost of the raw materials, the cost of disposing of the evaporated methanol, and the effect on the environment mean that industrial application of the method is difficult.

BRIEF SUMMARY OF THE INVENTION

However, the inventors of the present invention commenced extensive research aimed at achieving a method of manufacturing a powder coating which would resolve the various problems and drawbacks of the conventional techniques described above, would not require a long complicated manufacturing process, could be manufactured easily and at low cost, and moreover would be in no danger of gelling during the manufacturing process.

Consequently, an object of the present invention is to provide a method of manufacturing a powder coating which is able to be manufactured easily, without a long complicated process, and with good conservation of energy, and furthermore is in no danger of gelling during the manufacturing process.

As a result of extensive research into resolving the problems described above, the inventors discovered that when a powder coating raw materials solution comprising an epoxy group containing acrylic resin (A) and a polyvalent carboxylic acid (B) dissolved in an organic solvent (C) incorporating an alcohol (C-1) of 2 to 4 carbon atoms was spray dried at a temperature at which the epoxy group containing acrylic resin (A) and the polyvalent carboxylic acid (B) underwent no substantial curing reaction, a powder coating was able to be manufactured easily and cheaply, without any danger of gelling, and this enabled the inventors to complete the present invention.

In other words, the present invention provides a method of manufacturing a powder coating in which a powder coating raw materials solution comprising as essential constituents an epoxy group containing acrylic resin (A), a polyvalent carboxylic acid (B), and an organic solvent (C) incorporating an alcohol (C-1) of 2 to 4 carbon atoms is spray dried at a temperature at which the epoxy group containing acrylic resin (A) and the polyvalent carboxylic acid (B) undergo no substantial curing reaction.

The method of manufacturing a powder coating according to the present invention is a highly practical method which does not require the type of long complicated process associated with conventional methods of manufacturing powder coatings, and which enables the manufacturing to be completed easily and at low cost, and moreover with no danger of gelling occurring during the manufacturing process.

DETAILED DESCRIPTION OF THE INVENTION

As follows is a detailed description of the specifics of the present invention.

First, the epoxy group containing acrylic resin (A), which is one of the essential constituents of the powder coating raw materials solution used in the manufacturing method of the present invention, will be described.

In order to obtain a powder coating which displays a superior balance between storage stability and external appearance of the paint film, the epoxy group containing acrylic resin. (A) should preferably have a softening point within the range from 80 to 150° C.

Known methods can be applied to the preparation of the epoxy group containing acrylic resin (A), although a method wherein an individual vinyl monomer incorporating an epoxy group, and where necessary another copolymerizable vinyl monomer, are each polymerized in an organic solvent is the most simple, and is therefore preferred. Known materials can be used for the polymerization initiator and the solvent used in this preparation method.

Examples of particularly representative vinyl monomers with an epoxy group include monomers with an epoxy group such as glycidyl (meth) acrylate, β-methylglycidyl (meth) acrylate, glycidyl vinyl ether and allyl glycidyl ether; vinyl monomers with a (2-oxo-1,3-oxolane) group such as (2-oxo-1,3-oxolane) methyl (meth) acrylate; and vinyl monomers with an alicyclic epoxy group such as 3,4-epoxycyclohexyl (meth) acrylate, 3,4-epoxycyclohexylmethyl (meth) acrylate and 3,4-epoxycyclohexylethyl (meth) acrylate.

In addition, other copolymerizable vinyl monomers may also be used where necessary. Particularly representative examples of these other copolymerizable vinyl monomers include various acrylate esters such as methylacrylate, ethylacrylate, butylacrylate and cyclohexylacrylate; methacrylate esters such as methyl methacrylate, ethyl methacrylate, n-butyl methacrylate, iso-butyl methacrylate, tert-butyl methacrylate, cyclohexyl methacrylate and benzyl methacrylate; α-olefins such as ethylene, propylene and butene-1; halogenated olefins (halo olefins) with the exception of fluoroolefins such as vinyl chloride and vinylidene chloride; aromatic vinyl monomers such as styrene, α-methylstyrene and vinyltoluene; diesters of an unsaturated carboxylic acid with a monovalent alcohol of 1 to 18 carbon atoms, such as dimethyl fumarate, diethyl fumarate, dibutyl fumarate, dioctyl fumarate, dimethyl maleate, diethyl maleate, dibutyl maleate, dioctyl maleate, dimethyl itaconate, diethyl itaconate, dibutyl itaconate and dioctyl itaconate; amide based unsaturated monomers with an amino group such as N-dimethylaminoethyl (meth) acrylamide, N-diethylaminoethyl (meth) acrylamide, N-dimethylaminopropyl (meth) acrylamide and N-diethylaminopropyl (meth) acrylamide; dialkyl aminoalkyl (meth) acrylates such as dimethylaminoethyl (meth) acrylate and diethylaminoethyl (meth) acrylate; monomers with an amino group such as tert-butylaminoethyl (meth) acrylate, tert-butylaminopropyl (meth) acrylate, aziridinylethyl (meth) acrylate, pyrrolidinylethyl (meth) acrylate and piperidinylethyl (meth) acrylate; monomers with an acid anhydride group such as maleic anhydride, itaconic anhydride, citraconic anhydride, (meth) acrylic anhydride and tetrahydrophthalic anhydride; monomers with a phosphate ester group such as diethyl-2-(meth) acryloyloxyethyl phosphate, dibutyl-2-(meth) acryloyloxybutyl phosphate, dioctyl-2-(meth) acryloyloxyethyl phosphate and diphenyl-2-(meth) acryloyloxyethyl phosphate; monomers with a hydrolyzable silyl group such as γ-(meth) acryloyloxypropyl trimethoxysilane, γ-(meth) acryloyloxypropyl triethoxysilane and γ-(meth) acryloyloxypropyl methyldimethoxysilane; vinyl aliphatic carboxylates such as vinyl acetate, vinyl propionate, vinyl butyrate, vinyl isobutyrate, vinyl caproate, vinyl caprylate, vinyl caprate, vinyl laurate, vinyl branched aliphatic carboxylates of 9 carbon atoms, vinyl branched aliphatic carboxylates of 10 carbon atoms, vinyl branched aliphatic carboxylates of 11 carbon atoms and vinyl stearate; and vinyl esters of carboxylic acids with a cyclic structure such as vinyl cyclohexanecarboxylate, vinyl methylcyclohexanecarboxylate, vinyl benzoate and vinyl p-tert-butylbenzoate.

Additional examples include vinyl monomers with a carboxyl group such as (meth) acrylic acid, crotonic acid, itaconic acid, maleic acid and fumaric acid; monoesters of an α,β-unsaturated carboxylic acid and a monovalent alcohol of 1 to 18 carbon atoms such as monomethyl fumarate, monoethyl fumarate, monobutyl fumarate, monohexyl fumarate, mono-2-ethylhexyl fumarate, monomethyl maleate, monoethyl maleate, monobutyl maleate, monohexyl maleate and mono-2-ethylhexyl maleate; monoalkyl itaconate esters such as monomethyl itaconate, monoethyl itaconate, monobutyl itaconate, monohexyl itaconate and mono-2-ethylhexyl itaconate; (meth) acrylates with a hydroxyl group such as 2-hydroxyethyl (meth) acrylate, 2-hydroxypropyl (meth) acrylate, 3-hydroxypropyl (meth) acrylate, 2-hydroxybutyl (meth) acrylate, 3-hydroxybutyl (meth) acrylate, 4-hydroxybutyl (meth) acrylate, polyethylene glycol mono (meth) acrylate and polypropylene glycol mono (meth) acrylate; addition reaction products of the various aforementioned (meth) acrylates with ε-caprolactone; vinyl ethers with a hydroxyl group such as 2-hydroxyethyl vinyl ether, 4-hydroxybutyl vinyl ether, 2-hydroxy-2-methylpropyl vinyl ether and 6-hydroxyhexyl vinyl ether; addition reaction products of the various aforementioned vinyl ethers with ε-caprolactone; allyl ethers with a hydroxyl group such as 2-hydroxyethyl (meth) allyl ether, 4-hydroxybutyl (meth) allyl ether, 2-hydroxy-2-methylpropyl (meth) allyl ether and 6-hydroxyhexyl (meth) allyl ether; and addition reaction products of the various aforementioned allyl ethers with ε-caprolactone.

The amount of the epoxy group containing acrylic resin used should preferably be within a range from 10 to 70% by weight of the total weight of vinyl monomers used. Provided the amount of epoxy group containing acrylic resin used falls within the above range, a paint film with superior mechanical properties and flexibility can be obtained.

Appropriate number average molecular weights for the epoxy group containing acrylic resin (A) are within a range from 1000 to 20,000, with values in the range from 1500 to 15,000 being preferable. Provided the number average molecular weight of the epoxy group containing acrylic resin (A) falls within the above range, a paint film of superior smoothness and with superior mechanical properties can be obtained.

Next is a description of the polyvalent carboxylic acid (B).

The polyvalent carboxylic acid (B) can utilize compounds which are capable of undergoing a curing reaction with the epoxy group of the epoxy group containing acrylic resin (A), and provided the material is typically used in powder coatings, any material can be suitably used.

Particularly representative examples of the polyvalent carboxylic acid (B) include aliphatic dibasic acids such as succinic acid, glutaric acid, adipic acid, pimelic acid, suberic acid, azelaic acid, sebacic acid, dodecanedioic acid and icosanedioic acid; as well as maleic acid, citraconic acid, itaconic acid, glutaconic acid, phthalic acid, trimellitic acid, pyromellitic acid, tetrahydrophthalic acid, hexahydrophthalic acid and cyclohexene- 1,2-dicarboxylic acid, as well as acid anhydrides of these acids, or products formed by reaction of these acids with a polyisocyanate compound. Of these acids, aliphatic dibasic acids are preferred due to their superior paint film properties and storage stability, with dodecanedioic acid being particularly desirable due to the particularly superior paint film properties it offers.

The aforementioned polyvalent carboxylic acids (B) may be used individually, or in combinations of two or more acids.

The proportions of the polyvalent carboxylic acid (B) used relative to the curable group of the epoxy group containing acrylic resin (A) should preferably produce a ratio between the chemical equivalents of the epoxy group containing acrylic resin relative to the chemical equivalents of the polyvalent carboxylic acid of between 2.0 and 0.5, with ratios of 1.1 to 0.9 being particularly desirable.

Next is a description of the organic solvent (C).

The powder coating raw materials solution used in the present invention should preferably comprise the epoxy group containing acrylic resin (A) and the polyvalent carboxylic acid (B) completely dissolved in the organic solvent (C) at a temperature no greater than the temperature used during spray drying, and preferably at a temperature lower than that used during spray drying, for example normal room temperature.

In those cases where the epoxy group containing acrylic resin (A) and the polyvalent carboxylic acid (B) dissolve completely in the organic solvent (C), the epoxy group containing acrylic resin and the polyvalent carboxylic acid are mixed more uniformly than in the molten mixing used in conventional manufacturing methods, and consequently an improvement is observed in the paint film properties, including the external appearance of the paint film, of the paint film formed from the product powder coating.

Examples of the organic solvent (C) include organic solvents capable of dissolving the epoxy group containing acrylic resin (A) and/or the polyvalent carboxylic acid (B). These solvents can be used individually, or in combinations of two or more solvents, and although organic solvents which dissolve both the epoxy group containing acrylic resin (A) and the polyvalent carboxylic acid (B) are preferred, suitable solvent mixtures can also be prepared by combining two or more solvents including a solvent capable of dissolving the epoxy group containing acrylic resin (A) and an organic solvent capable of dissolving the polyvalent carboxylic acid (B). In addition, a solvent mixture could also be prepared by combining a solvent capable of dissolving both the epoxy group containing acrylic resin (A) and the polyvalent carboxylic acid (B), with a solvent essentially capable of dissolving only one of the epoxy group containing acrylic resin (A) and the polyvalent carboxylic acid (B).

In those cases where the epoxy group containing acrylic resin (A) is a resin obtained from solution polymerization, the solvent used during the polymerization of the epoxy group containing acrylic resin (A) can be used, as is, as either a part of, or all of the organic solvent (C).

From the viewpoint of improving the drying properties during spray drying, the boiling point of the organic solvent (C) should preferably be low. However if an organic solvent is used with a boiling point which is too low, then the likelihood of the powder coating raw materials solution blocking the spray nozzle increases, which becomes a major hindrance in production, and moreover the energy costs associated with cooling and liquefying the solvent vapor for collection are extremely high, and consequently organic solvents (C) with a boiling point at normal pressure of at least 70° C. are preferred.

Although there are no particular upper limit restrictions on the boiling point, in order to prevent a curing reaction between the epoxy group containing acrylic resin (A) and the polyvalent carboxylic acid (B) during spray drying, an organic solvent which will evaporate at a heat source gas temperature during the spray drying process of no more than 130° C., and preferably no more than 80° C., is preferred.

From the viewpoint of ensuring sufficient removal of the organic solvent during the spray drying process, it is desirable that at least 65% by weight, and preferably at least 70% by weight, of the organic solvent (C) comprises a solvent with a boiling point at normal pressure of no more than 100° C.

The organic solvent (C) incorporates an alcohol (C-1) of 2 to 4 carbon atoms. Generally, lower alcohols display superior dissolution of the polyvalent carboxylic acid (B), and in particular aliphatic dibasic acids, and as such are used in preference in the preparation of powder coating raw materials solutions, although in the manufacturing method of the present invention, an alcohol (C-1) of 2 to 4 carbon atoms is used.

If the number of carbon atoms is too few, such as in methanol with only one carbon atom, then the solubility of the epoxy group containing acrylic resin (A) reduces markedly, and as a result, achieving a powder coating raw materials solution in which the epoxy group containing acrylic resin (A) and the polyvalent carboxylic acid (B) are dissolved uniformly becomes difficult. In order to maintain the powder coating raw materials solution in a uniform state, heating is then normally required, which increases the manufacturing costs. In particular, if methanol is used for the solvent during the polymerization of the epoxy group containing acrylic resin (A), then obtaining a powder coating raw materials solution in which the epoxy group containing acrylic resin (A) is dissolved uniformly at normal temperature is extremely difficult.

If a solvent with a low boiling point such as methanol is used, then as described above, the likelihood of the spray nozzle blocking during spray drying increases, and furthermore when the solvent vapor is cooled, liquefied and recovered following the spray drying process, a great deal of energy is required for cooling the solvent vapor, which makes such solvents unsuitable for industrial use.

In contrast, alcohols of 5 carbon atoms or more display poor dissolution of the polyvalent carboxylic acid (B), and as such are unsuitable for dissolving the polyvalent carboxylic acid (B).

Furthermore, in those cases where the polyvalent carboxylic acid (B) incorporates an aliphatic dibasic acid, the amount of the alcohol of 2 to 4 carbon atoms (C-1) should preferably display a weight ratio of at least 4 relative to the aliphatic dibasic acid incorporated within the powder coating raw materials solution.

Particularly representative examples of the alcohol (C-1) with 2 to 4 carbon atoms include ethanol, n-propanol, isopropanol, n-butanol, isobutanol, sec-butanol, tert-butanol, methyl cellosolve and ethyl cellosolve.

Of these, n-propanol, iso-propanol, sec-butanol and isobutanol are used in preference as they offer superior spray drying qualities and superior solubility of the epoxy group containing acrylic resin (A).

In addition to the alcohol (C-1) with 2 to 4 carbon atoms, representative examples of the solvents which can be used as the organic solvent (C) include alkyl alcohols such as n-pentanol, isopentanol, n-hexanol, n-octanol, 2-ethylhexanol and cyclohexanol; polyvalent alcohols such as ethylene glycol, propylene glycol and glycerine; glycol ethers such as butyl cellosolve, hexyl cellosolve, ethylene glycol dimethyl ether, ethylene glycol diethyl ether, ethylene glycol dipropyl ether, ethylene glycol dibutyl ether, propylene glycol monomethyl ether, propylene glycol monoethyl ether, propylene glycol monopropyl ether, propylene glycol monobutyl ether, propylene glycol dimethyl ether, propylene glycol diethyl ether, propylene glycol dipropyl ether, propylene glycol dibutyl ether, methyl carbitol, ethyl carbitol, diethylene glycol dimethyl ether, diethylene glycol diethyl ether, diethylene glycol dipropyl ether and diethylene glycol dibutyl ether;aromatic hydrocarbons such as benzene, toluene, xylene and ethylbenzene; aliphatic hydrocarbons such as n-pentane, n-hexane and n-octane; alicyclic hydrocarbons such as cyclopentane, cyclohexane, methylcyclohexane and ethylcyclohexane; mixed hydrocarbons such as mineral spirit;ethers such as dimethoxyethane, tetrahydrofuran, dioxane, diisopropyl ether and di-n-butyl ether; ketones such as acetone, methyl ethyl ketone, methyl isobutyl ketone, diisobutyl ketone, methyl amyl ketone, cyclohexanone and isophorone; esters such as methyl acetate, ethyl acetate, n-propyl acetate, isopropyl acetate and amyl acetate; as well as N-methylpyrrolidone, dimethyl formamide, dimethyl acetamide and ethylene carbonate.

Of the above solvents, aromatic hydrocarbons, ketones and esters are used in preference as they offer superior solubility of the epoxy group containing acrylic resin (A).

Moreover where necessary, pigments, other resins, curing catalysts and other additives may be added to the powder coating raw materials solution, and either dissolved or dispersed before manufacturing the paint.

Particularly representative examples of pigments include the various common inorganic pigments, the various common organic pigments such as phthalocyanine based pigments, anthraquinone based pigments and quinacridone based pigments, as well as various common bright (metallic) pigments such as aluminum flakes and mica flakes.

Particularly representative examples of other resins include acrylic resins, polyester resins, fluororesins, silicon resins, or resins such as chlorinated polyethylene, chlorinated polypropylene, petroleum resin, epoxy resin or chlorinated rubber, and such resins are in addition to the epoxy group containing acrylic resin (A) and the polyvalent carboxylic acid (B).

Examples of additives include the common additives such as rheology control agents, anti-flooding agents, antioxidants, ultraviolet absorption agents, light stabilizers and silane coupling agents.

Moreover where necessary, the various cellulose derivatives such as nitrocellulose and cellulose acetate butyrate may also be used.

Next is a description of the spray drying apparatus.

The spray drying apparatus can be any apparatus capable of removing organic solvents from the sprayed powder coating raw materials solution, and typically utilizes a spray drying apparatus which volatilizes the organic solvents through contact of the sprayed powder coating raw materials solution with a heat source gas. Because the spray drying apparatus volatilizes organic solvents, the apparatus should preferably have explosion proof specifications. Furthermore, from the viewpoint of reducing the amount of organic solvent vapor in the heat source gas used for drying the sprayed powder coating raw materials solution, a solvent recovery apparatus should also preferably be provided.

There are no particular restrictions on the system used for bringing the powder coating raw materials solution in contact with the heat source gas, and any of the typical systems such as co-current systems, counter-current systems, or co-current/counter-current mixed systems may be used.

Similarly the spray system for the powder coating raw materials solution can utilize any of the common systems such as rotary disc systems, two fluid nozzle systems or pressure nozzle systems. The factors controlling the particulate diameter during the spraying process include the rotational speed in the case of a rotary disc system, the discharge speed from the nozzle and the mixing ratio of the raw materials solution and the compressed air mixed with the raw materials solution in the case of a two fluid nozzle system, and the discharge pressure in the case of a pressure nozzle system, and the values of these factors can be determined in accordance with the target particulate diameter.

The supply speed for the raw materials solution and the flow rate for the heat source gas can also be determined in accordance with the target particulate diameter, although if the supply speed of the raw materials solution or the flow rate of the heat source gas varies during the spray drying process, then the particulate diameter of the obtained particles, the particulate distribution and the value of the non-volatile component will also vary, and so it is preferable that these supply rates are maintained at a uniform level during the spray drying process.

Normally, the heat source gas containing the particles obtained from the spray drying is subsequently guided into a classification device such as a cyclone, where collection and classification of the particles is carried out.

The heat source gas should preferably be an inert gas. Of the inert gases, the use of nitrogen gas is desirable from a cost viewpoint. The temperature of the heat source gas should be set at a temperature where the epoxy group containing acrylic resin (A) and the polyvalent carboxylic acid (B) undergo no substantial curing reaction, in other words within a temperature range wherein even if a curing reaction partially proceeds, there is no substantial deterioration in the paint properties of the produced powder coating. There are no particular restrictions on the lower limit of the temperature of the heat source gas, although in order to ensure efficient vaporization of the solvent, the temperature should preferably be at least 40° C., and normally the temperature of the heat source gas should be suitably set within the range from 40 to 130° C. Particularly in those cases where the proportion of the organic solvent (C) with a boiling point of no more than 100° C. is 65% by weight, the temperature of the heat source gas may be lower than the range described above, and even if the temperature of the heat source gas is within the range from 20 to 80° C., the organic solvent (C) can still be volatilized efficiently. The flow rate of the heat source gas and the supply speed for the powder coating raw materials solution may be suitably adjusted to achieve the target particulate diameter, under conditions which produce a non-volatile component of the produced particles of at least 99% by weight. There are no particular restrictions on the pressure inside the apparatus, which may be at normal pressure, reduced pressure or may be pressurized Furthermore, the concentration of the non-volatile component in the powder coating raw materials solution at the time of spray drying may be suitably determined in accordance with the specifications of the spray drying apparatus, and the conditions under which the spray drying is conducted.

In addition, in order to improve the efficiency of the solvent volatilization, the powder coating raw materials solution may be preheated prior to the spray drying process. In such cases, the temperature of the preheating should preferably be no more than 70° C. in order to prevent gelling of the powder coating raw materials solution, and furthermore the spray drying should preferably be conducted as promptly as possible following the preheating.

The thus obtained powder coating can be used as is, as a powder coating, although where necessary, secondary drying by another drying method such as vacuum drying may also be carried out. In such cases, in order to prevent gelling of the powder coating, the secondary drying should preferably be conducted at a temperature of no more than approximately 70° C.

Furthermore the particulate diameter of the obtained powder coating may also be adjusted where necessary, using either a crushing process or a granulation process.

The powder coating manufactured by the manufacturing method of the present invention can then be applied to a wide range of uses including the finishing coat for vehicles, intermediate coats for vehicles, as well as paint for vehicle components, construction materials, household electrical appliances, and various metallic products.

Particularly representative examples of the types of base materials which can be painted using a powder coating manufactured by a manufacturing method according to the present invention include metallic raw materials or metallic products such as aluminum, stainless steel, chrome plating, galvanized iron and tin plate; tiles; glass; and various mineral based construction materials; and more specifically, vehicle bodies and vehicle components; two wheeled vehicles and the components thereof; various construction materials such as gates and fences; various architectural materials for inside or outside use such as aluminum sashes; and various other iron or nonferrous metal based materials or products such as aluminum wheels.

The powder coatings obtained from the manufacturing method of the present invention can be applied to the types of base materials described above using standard methods, and then baked and dried according to standard methods, and provide a paint film with superior distribution, curability, external appearance, weather resistance and mechanical properties.

EXAMPLES

As follows, the present invention is described in even more detail using a series of reference examples, working examples and comparative examples, although it should be noted that the present invention is, of course, not limited to the examples listed below. In the following description, unless otherwise stated, the term "parts" refers to "parts by weight".

Reference Example 1 Preparation of a Main Constituent Acrylic Resin (A))

In a reaction vessel equipped with a stirrer, a thermometer, a condenser and a nitrogen gas inlet was placed 1800 parts of xylene, and the temperature was raised to 135° C. under an atmosphere of nitrogen. A mixture of 450 parts of styrene, 900 parts of methyl methacrylate, 300 parts of n-butyl methacrylate, 1350 parts of glycidyl methacrylate, 240 parts of tert-butylperoxyoctoate and 600 parts of xylene was then dripped into the reaction vessel over a period of six hours. Following completion of the addition, the same temperature was maintained for a further five hours to complete the polymerization reaction, and yielded a solution (A'-1) (non-volatile component 57.2%) of an epoxy group containing acrylic resin (A-1) with an epoxy equivalence of 345 and a number average molecular weight of 2100. The properties of the resin are shown in Table 1.

Reference Example 2 (As Above)

1800 parts of methyl ethyl ketone were placed in a stainless steel autoclave in which the air inside had been replaced with nitrogen, and the temperature was raised to 135° C. A mixture of 1470 parts of methyl methacrylate, 330 parts of n-butyl methacrylate, 1200 parts of glycidyl methacrylate, 225 parts of tert-butylperoxyoctoate and 600 parts of methyl ethyl ketone was then dripped into the autoclave over a period of six hours. Following completion of the addition, the same temperature was maintained for a further five hours to complete the polymerization reaction, and yielded a solution (A'-2) (non-volatile component 57.5%) of an epoxy group containing acrylic resin (A-2) with an epoxy equivalence of 385 and a number average molecular weight of 2300. The properties of the resin are shown in Table 1.

Reference Example 3 (As Above)

With the exception of the alterations in the monomers, the polymerization initiator and the solvent shown in Table 1, a solution (A'-3) of an epoxy group containing acrylic resin (A-3) was obtained using the same method described in the reference example 2. The properties are shown in Table 1.

TABLE 1

|  | Reference example 1 | Reference example 2 | Reference example 3 |
| --- | --- | --- | --- |
| Monomers |  |  |  |
| styrene | 450 | — | 750 |
| MMA | 900 | 1470 | 450 |
| nBMA | 300 | 330 | — |
| iBMA | — | — | 900 |
| GMA | 1350 | 1200 | 900 |
| Polymerization initiator |  |  |  |
| TBPO | 240 | 225 | 180 |
| Solvent | Xy | MEK | IPA |
| Polymerization temperature (° C.) | 135 | 135 | 135 |
| Properties |  |  |  |
| Epoxy equivalence of the resin | 345 | 385 | 505 |
| Number average molecular weight of the resin | 2100 | 2300 | 2600 |
| Non-volatile component of the solution (%) | 57.2 | 57.5 | 57.0 |
| Name used for the epoxy group containing acrylic resin solution | A'-1 | A'-2 | A'-3 |

Footnotes for Table 1
MMA    methyl methacrylate
nBMA   n-butyl methacrylate
IBMA    isobutyl methacrylate
GMA    glycidyl methacrylate
Xy         xylene
MEK    methyl ethyl ketone
IPA     isopropanol
TBPO   tert-butylperoxyoctoate

Reference Example 4 (Preparation of a Powder Coating Raw Materials Solution)

In a reaction vessel equipped with a stirrer, a thermometer, a condenser and a nitrogen gas inlet was placed 1330 parts of the main constituent acrylic resin solution (A'-1) produced in the reference example 1,400 parts of methyl ethyl ketone and 1000 parts of isopropanol, and the temperature was raised to 30° C. With continuous stirring, 240 parts of dodecanedioic acid were added as the polyvalent carboxylic acid (B), together with 5 parts of benzoin and 2 parts of KP322 (a silicone based rheology control agent manufactured by Shin-Etsu Chemical Ltd.). Subsequent stirring for a further 30 minutes yielded a transparent powder coating raw materials solution (S-1) with the raw materials uniformly dissolved at room temperature. The properties of the solution (S-1) are shown in Table 3.

Reference Examples 5, 6 (As Above)

With the exceptions of the alterations in the epoxy group containing acrylic resin solution, the polyvalent carboxylic acid (B), the various additives and the dilution solvents shown in Table 2(1) and Table 2(2), powder coating raw materials solutions (S-2) and (S-3) were obtained using the same method described in the reference example 3. The properties of the solutions are shown in Table 3(1) and Table 3(2) respectively.

Reference Example 7 (Preparation of a Powder Coating Raw Materials Solution with Dispersed Pigment)

To 1440 parts of the main constituent acrylic resin solution (A'-3) produced in the reference example 3 was added 430 parts of "Tipaque CR-90" (rutile type titanium dioxide manufactured by Ishihara Sangyo Kaisha, Ltd.), and a pigment dispersed resin solution was then prepared by dispersing the pigment with a sand mill.

Subsequently, the pigment dispersed resin solution, 1200 parts of methyl ethyl ketone and 4.00 parts of isobutanol were placed in a reaction vessel equipped with a stirrer, a thermometer, a condenser and a nitrogen gas inlet, and the temperature was raised to 30° C. With continuous stirring, 180 parts of dodecanedioic acid were added, together with 5 parts of benzoin and 5 parts of "Acronal 4F" (a rheology control agent manufactured by BASF Corporation of Germany). Subsequent stirring for a further 30 minutes yielded a powder coating raw materials solution (S-4). The properties of the solution (S-4) are shown in Table 3(2).

TABLE 2 (1)

|  |  | Reference example 4 | Reference example 5 |
|---|---|---|---|
| Epoxy group containing acrylic resin solution | A'-1 | 1330 | — |
|  | A'-2 | — | 1370 |
| Polyvalent carboxylic acid (B) | Dodecanedioic acid | 240 | 220 |
| Additives | Benzoin | 5 | 5 |
|  | KP322 | 2 | 2 |
| Dilution Solvents | MEK | 400 | 400 |
|  | IPA | 1000 | 1000 |
| Name used for the powder coating raw materials solution |  | S-1 | S-2 |

TABLE 2 (2)

|  |  | Reference example 6 | Reference example 7 |
|---|---|---|---|
| Epoxy group containing acrylic resin solution | A'-3 | 1440 | 1440 |
| Polyvalent carboxylic acid (B) | Dodecanedioic acid | 180 | 180 |
| Additives | Benzoin | 5 | 5 |
|  | KP322 | 2 | — |
|  | Acronal 4F | — | 2 |
| Pigment | CR-90 | — | 430 |
| Dilution Solvents | MEK | 800 | 1200 |
|  | IPA | 400 | — |
|  | iBuOH | — | 400 |
| Name used for the powder coating raw materials solution |  | S-3 | S-4 |

Footnotes for Table 2
MEK   methyl ethyl ketone
IPA   isopropanol
iBuOH   isobutanol
CR-90   "Tipaque CR-90" rutile type titanium dioxide manufactured by Ishihara Sangyo Kaisha, Ltd.
KP322   a silicone based rheology control agent manufactured by Shin-Etsu Chemical Ltd.
Acronal 4F a rheology control agent manufactured by BASF Corporation of Germany

TABLE 3 (1)

|  | Reference example 4 | Reference example 5 |
|---|---|---|
| Name used for the powder coating raw materials solution | S-1 | S-2 |
| Properties |  |  |
| Non-volatile component (%) | 34 | 33 |
| Proportion of total solvent mixture made up of solvents with a boiling point of no more than 100° C. | 71 | 100 |
| Weight ratio of amount of alcohol to amount of aliphatic dibasic acid | 4.2 | 4.5 |

TABLE 3 (2)

|  | Reference example 6 | Reference example 7 |
|---|---|---|
| Name used for the powder coating raw materials solution | S-3 | S-4 |
| Properties |  |  |
| Non-volatile component (%) | 36 | 39 |
| Proportion of total solvent mixture made up of solvents with a boiling point of no more than 100° C. | 100 | 82 |
| Weight ratio of amount of alcohol to amount of aliphatic dibasic acid | 4.8 | 4.8 |

Example 1

A powder coating was prepared in an explosion-proof vertical fall co-current type spray drying apparatus equipped with a solvent recovery apparatus, using a rotary disc system for the spray system. With the rotational speed of the rotary disc set at 15,000 rpm, and using nitrogen gas as the heat source gas, the raw materials solution and the heat source gas were brought into contact using a vertical fall co-current system. The temperature of the gas was set at 80° C., and the temperature of the solvent vapor cooling section of the solvent recovery apparatus was set at −15° C. The powder coating raw materials solution (S-1), preheated to a temperature of 35° C., was sprayed into the spray drying apparatus with a supply speed of 0.5 kg/hr, and by using a cyclone to collect the particles of powder coating dried inside the apparatus, a powder coating with an average particulate diameter of 15 μm was obtained. The shape of the particles was substantially spherical. The non-volatile component of the obtained powder coating was 99.0%.

Examples 2 to 4 (As Above)

With the exceptions of using the powder coating raw materials solutions (S-2) to (S-4) in place of the powder coating raw materials solution (S-1), and altering the preheated temperature of the powder coating raw materials solution and the temperature of the heat source gas as shown in Table 4(1) and Table 4(2), powder coatings (P-2) to (P-4) were obtained using the same method described in the example 1. The properties of the powder coatings are shown in Table 4(1) and Table 4(2).

Comparative Example 1

The powder coating raw materials solution (S-1) was prepared in the same manner as the example 1, and with the exception of altering the temperature of the heat source gas to 170° C., an attempt was made to prepare a powder coating in the same manner as the example 1, but the obtained particles gelled and agglomerated.

Comparative Example 2

A powder coating raw materials solution (S-7) was prepared in the same manner as the example 4, with the exception that the solvent used was changed from isopropanol to methanol. The thus obtained powder coating raw materials solution (S-7) was spray dried in the same manner as the example 1, but with the temperature of the solvent vapor cooling section of the solvent recovery apparatus set at −15° C., the methanol vapor underwent insufficient liquefaction, the concentration of methanol vapor in the heat source gas became too high, and the non-volatile component of the obtained powder coating decreased, and so the temperature of the solvent vapor cooling section of the solvent recovery apparatus needed to be reduced to −40° C. In addition, the spray nozzle became clogged frequently during the spray drying process, and needed to be cleaned on each occasion.

Comparative Example 3

With the exception of altering the solvent used from isopropanol to methanol, a solution (A'-5) of the epoxy group containing acrylic resin (A-5) was prepared in the same manner as the reference example 3. At temperatures of no more than 60° C., precipitation of the epoxy group containing acrylic resin (A-5) occurred in the obtained solution, and a uniform solution was not able to be attained. By maintaining the solution at a temperature of 63° C., and then adding and dissolving the polyvalent carboxylic acid (B), the additives and the dilution solvents in the same manner as the reference example 6, a powder coating raw materials solution (S-8) was prepared. The thus obtained powder coating raw materials solution (S-8) produced a precipitation at temperatures below 45° C., and a uniform solution was not able to be attained. Using the powder coating raw materials solution (S-8), spray drying was conducted in the same manner as for the example 3, with the exception that the preheating temperature of the raw materials solution was raised to 50° C., but the spray nozzle clogged immediately after commencing the spray drying process, and spray drying of the raw materials solution became impossible, and as a result there was no option but to halt the manufacture.

TABLE 4 (1)

|  | Example 1 | Example 2 |
|---|---|---|
| Powder coating raw materials solution | S-1 | S-2 |
| Preheating temperature (° C.) | 35 | 35 |
| Heat source gas temperature (° C.) | 80 | 45 |
| Properties |  |  |
| External Appearance (visual inspection) | White colored granules | White colored granules |
| Non-volatile component of particles following spray drying (%) | 99.0 | 99.4 |
| Name used for the powder coating | P-1 | P-2 |

TABLE 4 (2)

|  | Example 3 | Example 4 |
|---|---|---|
| Powder coating raw materials solution | S-3 | S-4 |
| Preheating temperature (° C.) | 30 | 40 |
| Heat source gas temperature (° C.) | 40 | 80 |
| Properties |  |  |
| External Appearance (visual inspection) | White colored granules | White colored granules |
| Non-volatile component of particles following spray drying (%) | 99.3 | 99.1 |
| Name used for the powder coating | P-3 | P-4 |

Reference Example 8 (Properties of a Cured Paint Film of a Powder Coating Manufactured According to a Manufacturing Method of the Present Invention)

A zinc phosphate treated steel sheet of thickness 0.8 mm onto which had been baked a 30 μm film of a white solvent based alkyd coating was electrostatically spray coated with the powder coating (P-1) obtained from the example 1, to form a film of 60 μm. By curing the painted experimental sheet by baking for 20 minutes at 140° C., a painted sheet with a cured paint film was obtained. The properties of the cured paint film are shown in Table 5(1).

Reference Examples 9, 10 (As Above)

With the exceptions of altering the powder coating used as shown in table 5(1) and altering the baking temperature to 160° C., painted sheets were prepared in the same manner as the reference example 8. The properties of the obtained cured paint films are shown in Table 5(2).

Reference Example 11 (As Above)

A zinc phosphate treated steel sheet of thickness 0.8 mm was electrostatically spray coated with the powder coating (P-4) obtained from the example 4 to form a film of 60 μm. By curing the painted experimental sheet by baking for 20 minutes at 160° C., a painted sheet was obtained. The properties of the cured paint film are shown in Table 5(2).

Comparative Reference Example 1 (Manufacture of a Powder Coating by a Conventional Manufacturing Method)

1330 parts of the main constituent acrylic resin solution (A'-1) obtained from the reference example 1 was placed under reduced pressure and the solvent removed at 150° C. and 30 hPa to yield the main constituent acrylic resin (A-1).

The thus obtained main constituent acrylic resin (A-1) was subject to coarse crushing, and with the exception that the dilution solvents were not used, was subsequently dry blended with the polyvalent carboxylic acid (B), the catalyst and the additives, using the same mixing proportions as the reference example 4, before being subject to molten mixing using a "Cokneader PR-46" (an extrusion mixing device manufactured by Buss Corporation of Switzerland). Following cooling, the mixture was crushed and passed through a 150 mesh sieve, with the powdered fraction which passed through the sieve being collected as a powder coating (P-5). This powder coating was used to prepare a painted sheet in the same manner as the reference example 8. The properties of the produced cured paint film are shown in Table 5(2).

TABLE 5 (1)

|  | Reference example 8 | Reference example 9 | Reference example 10 |
|---|---|---|---|
| Powder coating | P-1 | P-2 | P-3 |
| Properties |  |  |  |
| External appearance |  |  |  |
| Visual inspection | ◎–○ | ◎ | ◎ |
| 60° gloss | 91 | 94 | 95 |
| Gel proportion (%) | 94 | 96 | 95 |
| Blocking resistance | ○ | ○ | ○ |

TABLE 5 (2)

|  | Reference example 11 | Comparative reference example 1 |
|---|---|---|
| Powder coating | P-4 | P-5 |
| Properties |  |  |
| External appearance |  |  |
| Visual inspection | ◎–○ | Δ |
| 60° gloss | 91 | 80 |

TABLE 5 (2)-continued

|  |  |  |
|---|---|---|
| Gel proportion (%) | 96 | 96 |
| Blocking resistance | ○ | ○ |

Footnotes for Table 5

| Visual inspection | Judgement of the smoothness of the paint film by visual inspection |
|---|---|
| Gel proportion | The proportion (weight ratio) of paint film remaining when 1 g of a paint film which had been cured at a predetermined bake temperature was immersed in acetone at room temperature for 3 days. Higher values indicate a better paint curability, and the ability to obtain a good painted film. |
| Blocking resistance | The manufactured paint was placed in a thermostat at 25° C. for 2 weeks, and the workability of the paint during spraying then judged for a second time. |
| ○: | No problems |
| Δ: | Spraying difficult due to partial agglomeration |
| x: | Spraying impossible |

What is claimed is:

1. A method of manufacturing a powder coating wherein a powder coating raw materials solution comprising, as essential constituents, an epoxy group containing acrylic resin (A), a polyvalent carboxylic acid (B), and an organic solvent (C) incorporating an alcohol (C-1) of 2 to 4 carbon atoms is spray dried at a temperature at which said epoxy group containing acrylic resin (A) and said polyvalent carboxylic acid (B) undergo no substantial curing reaction, wherein said alcohol (C-1) of 2 to 4 carbon atoms is at least one compound selected from a group consisting of n-propanol, isopropanol, sec-butanol and isobutanol.

2. A method of manufacturing a powder coating according to claim 1, wherein at least 65% by weight of said organic solvent (C) comprises organic solvent with a boiling point at normal pressure of no more than 100° C.

3. A method of manufacturing a powder coating according to claim 1, wherein said polyvalent carboxylic acid (B) incorporates at least one aliphatic dibasic acid.

4. A method of manufacturing a powder coating according to claim 3, wherein said aliphatic dibasic acid is dodecanedioic acid.

5. A method of manufacturing a powder coating according to claim 3, wherein an amount of said alcohol (C-1) of 2 to 4 carbon atoms in said organic solvent (C) has a weight ratio of at least 4 relative to said aliphatic dibasic acid incorporated within said powder coating raw materials solution.

* * * * *